United States Patent
Hans et al.

[11] Patent Number: 5,945,751
[45] Date of Patent: Aug. 31, 1999

[54] DISK STORAGE DEVICE HAVING A SPINDLE DRIVING MOTOR

[75] Inventors: Helmut Hans; Jürgen Oelsch, both of St. Georgen, Germany

[73] Assignee: Papst Licensing GmbH, Germany

[21] Appl. No.: 08/480,714

[22] Filed: Jun. 7, 1995

Related U.S. Application Data

[63] Continuation of application No. 08/167,845, Feb. 27, 1993, abandoned, which is a continuation of application No. PCT/EP92/01457, Jun. 29, 1992.

[30] Foreign Application Priority Data

Jun. 28, 1991 [DE] Germany .............................. 41 21 428

[51] Int. Cl.⁶ .............................. H02K 7/08; G11B 17/08
[52] U.S. Cl. ...................... 310/67 R; 310/156; 369/269; 360/98.07
[58] Field of Search .................. 310/67 R, 156; 360/98.07; 369/269

[56] References Cited

U.S. PATENT DOCUMENTS

| | | | |
|---|---|---|---|
| 3,822,602 | 7/1974 | Holmes et al. ...................... | 310/67 R |
| 4,658,312 | 4/1987 | Elsässer et al. ...................... | 360/97 |
| 4,739,427 | 4/1988 | Kilmer et al. ...................... | 360/97.02 |
| 4,779,165 | 10/1988 | Elsaesser et al. ...................... | 360/97 |
| 4,797,762 | 1/1989 | Levy et al. ...................... | 360/99.06 |
| 4,814,652 | 3/1989 | Wright ...................... | 360/98.07 |
| 4,835,839 | 6/1989 | Forbes et al. ...................... | 29/596 |
| 4,853,567 | 8/1989 | Muramatsu et al. ...................... | 310/67 R |
| 4,998,033 | 3/1991 | Hisabe et al. ...................... | 310/67 R |
| 5,001,581 | 3/1991 | Elsasser et al. ...................... | 360/98.02 |
| 5,006,943 | 4/1991 | Elsasser et al. ...................... | 360/99.08 |
| 5,040,085 | 8/1991 | Elsasser et al. ...................... | 360/98.07 |
| 5,047,677 | 9/1991 | Mineta et al. ...................... | 310/67 R |
| 5,047,738 | 9/1991 | Hishida et al. ...................... | 310/67 R |
| 5,091,809 | 2/1992 | Connors et al. ...................... | 360/99.08 |
| 5,138,209 | 8/1992 | Chuto et al. ...................... | 310/67 R |
| 5,160,865 | 11/1992 | Gururangan ...................... | 310/67 R |
| 5,173,814 | 12/1992 | Elsasser et al. ...................... | 360/98.07 |
| 5,216,557 | 6/1993 | Elsaesser et al. ...................... | 360/99.08 |
| 5,227,686 | 7/1993 | Ogawa ...................... | 310/90 |
| 5,243,242 | 9/1993 | Cap et al. ...................... | 310/67 R |
| 5,256,926 | 10/1993 | Hagenlocher et al. ...................... | 310/259 |
| 5,446,610 | 8/1995 | Elsaesser et al. ...................... | 360/99.08 |
| 5,510,661 | 4/1996 | Yoshimura et al. ...................... | 310/78 R |
| 5,698,919 | 12/1997 | Obara ...................... | 310/67 R |

FOREIGN PATENT DOCUMENTS

| | | | |
|---|---|---|---|
| WO88/06781 | 9/1988 | European Pat. Off. ........ | G11B 5/012 |
| 0 402 240 | 12/1990 | European Pat. Off. ......... | H02K 7/08 |
| 965860 | 9/1950 | France . | |
| A 965860 | 9/1950 | France . | |
| 136683 | 7/1979 | Germany ...................... | H02K 15/02 |
| 3 135 385 A1 | 3/1983 | Germany ...................... | G11B 19/20 |
| 3 538 480 A1 | 4/1986 | Germany ...................... | G11B 3/58 |
| 3 542 542 A1 | 6/1987 | Germany ...................... | G11B 19/20 |
| 3818994A1 | 12/1988 | Germany ...................... | G11B 19/20 |
| 57-105863 | 7/1982 | Japan ...................... | G11B 19/20 |
| 0256983 | 12/1985 | Japan ...................... | 369/269 |
| 61-242378 | 10/1986 | Japan ...................... | G11B 21/02 |
| 3-198640 | 8/1991 | Japan ...................... | H02K 16/03 |
| 0 216 465 | 5/1924 | United Kingdom .................. | 369/269 |
| 0 415 794 | 9/1934 | United Kingdom ................. | 310/67 R |
| 996 919 | 6/1965 | United Kingdom . | |
| 2 166 586 | 5/1980 | United Kingdom ............ | G11B 33/14 |
| 2166586 | 5/1986 | United Kingdom ............ | G11B 33/14 |
| 2 202 386 | 9/1988 | United Kingdom ............ | H02K 5/173 |

*Primary Examiner*—Thomas M. Dougherty
*Attorney, Agent, or Firm*—Fitch, Even, Tabin & Flannery

[57] ABSTRACT

The invention relates to a spindle driving motor, in particular an external rotor motor, the main components of which are accommodated in the interior of a driving hub (4) or the back iron (5). According to the invention, in order to minimize the number of joints, both ball bearings (11, 12) are arranged directly, yet correctly as far as assembly is concerned, between the fixed shaft (10) and the back iron (5), a collar (15) having a larger diameter serving in particular to this end.

25 Claims, 4 Drawing Sheets

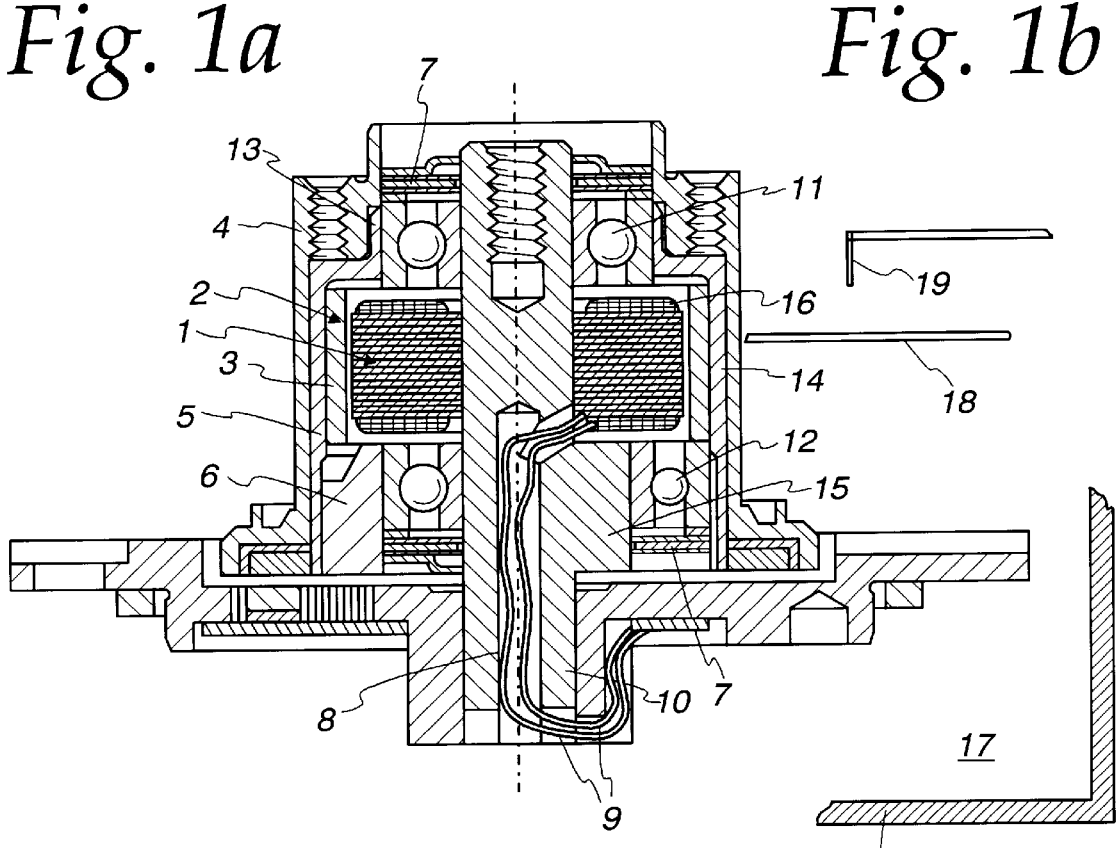
*Fig. 1a*  *Fig. 1b*
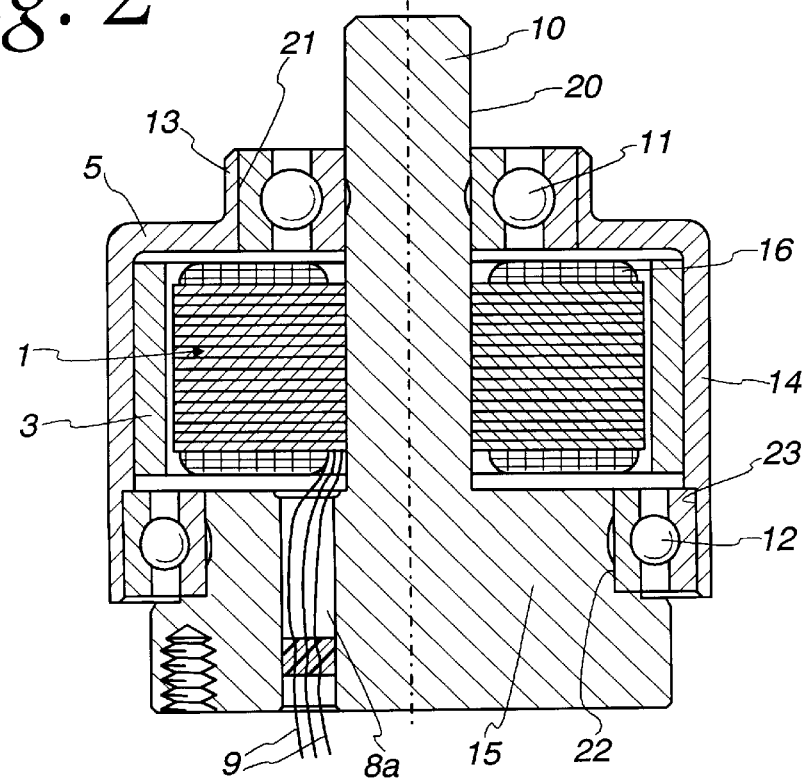
*Fig. 2*

DISK STORAGE DEVICE HAVING A SPINDLE DRIVING MOTOR

This application is a continuation of U.S. patent application Ser. No. 08/167,845, filed Dec. 27, 1993, now abandoned, and assigned a PCT § 371 filing date of Jul. 20, 1994.

The invention relates to a spindle driving motor having the features of the pre-characterising part of claim 1.

A spindle driving motor for disc memory drives of this kind is already known from DE-A 38 18 994. In the disc memory drive described there (see in particular FIGS. 3, 5 and 6), the annular back iron is cup-shaped, the upper section having a smaller internal diameter being supported directly on what is referred to as a "fixed shaft or axle" by means of a ball bearing, while the lower section having a larger diameter is supported on a ball bearing sitting on the shaft by means of a spacer ring. It is impossible to reduce the diameter of the annular back iron in the lower region as well in order to avoid the need for the spacer ring, as it would then be impossible to assemble the spindle driving motor, in particular the fixed internal stator. However, these additional joints present as a result of the spacer ring result in uneven, imprecise running of the driving hub, this leading to problems, particularly in the case of disc memory drives with a high storage density. Running faults include, in particular, non-repeatable-run-out and thermal-run-out faults.

The object of this invention is to reduce these inaccuracies during operation and to increase the precision of spindle driving motors of this kind, particularly in the case of disc memory drives with a high storage density. A long service life of the bearings of the spindle driving motor is simultaneously aimed for.

This problem is solved according to the invention in the case of a spindle driving motor of the type described at the outset by the features of the characterising part of claim 1.

The invention departs from the knowledge that the entire spindle driving motor must have a uniform material structure, consisting of the fixed shaft or axle, the ball bearings and the back iron, the number of joints being reduced to a minimum. However, it must be borne in mind in this connection that the spindle driving motor must still be designed with high precision, yet correctly as far as assembly is concerned.

One advantageous embodiment is characterised in that the annular back iron has a can-shaped narrowed portion at the second end of the driving hub and one of the ball bearings is arranged at this end directly between the narrowed portion and the shaft, and that the fixed shaft is provided with an integrally moulded collar on which the other larger ball bearing is directly arranged, on which the corresponding section of the annular back iron is supported.

This design allows for simple assembly. The increase in the size of the (lower) ball bearing simultaneously increases the virtual distance between the bearings of the spindle driving motor, resulting in a higher load-bearing capacity and/or lengthening of the service life or allowing for lower preloading of the bearings with identical rigidity or allowing greater rigidity to be achieved with identical preloading of the bearings.

The collar integrally moulded with the fixed shaft is preferably designed in the form of a shaft flange, this improving the securing possibilities of the shaft. In such a solution, the connecting wires of the external rotor motor are preferably brought out through a bore in the collar at the first end of the driving hub. This prevents weakening of the fixed shaft by bores for the passage of the connecting wires, as was the case in the prior art. Moreover, this facilitates assembly of the connecting wires.

Another advantageous embodiment is characterised in that the fixed shaft has a section of reduced diameter between the ball bearings on either side in order to receive the internal stator and that the internal stator is composed of at least two segments which are inserted radially into this section and are secured, e.g. by gluing.

This method of radial assembly of the internal stator divided into segments allows for freedom of the external diameter of the fixed shaft, in order in this manner to accommodate both ball bearings directly between the fixed shaft and the back iron in order to minimise the number of joints. The divided design of the stator and the gluing of the individual sectors to the shaft result in the further advantage of further vibration damping of the entire arrangement if an appropriate adhesive is used.

In order to further reduce the number of joints, it is also possible for the inner ring of at least one of the ball bearings to be integrally formed by the fixed shaft (or the integral collar thereof) and/or for the outer ring of at least one of the ball bearings to be integrally formed by the back iron, i.e. for the corresponding ball races to be formed in these parts.

The invention can be applied to spindle driving motors of any desired type, e.g. with a.c. motors or d.c. motors. However, spindle driving motors of this kind are preferably provided with an external rotor motor in the form of a brushless d.c. motor with a permanent-magnetic external rotor.

Several embodiments of the invention will now be described with reference to the accompanying drawings. In the drawings, the left and right halves show partially different solutions, this being indicated by the suffixes "a" and "b".

In these drawings:

In the drawings, FIGS. 1a and 1b are drawn integrally and appear as one figure. The same is also true for FIGS. 3a and 3b; FIGS. 4a and 4b; and FIGS. 6a and 6b.

FIG. 1a shows a spindle driving motor of known design;

FIG. 1b shows a first embodiment of the invention;

FIG. 2 shows a second embodiment of the invention;

Figures 3A, 3B:
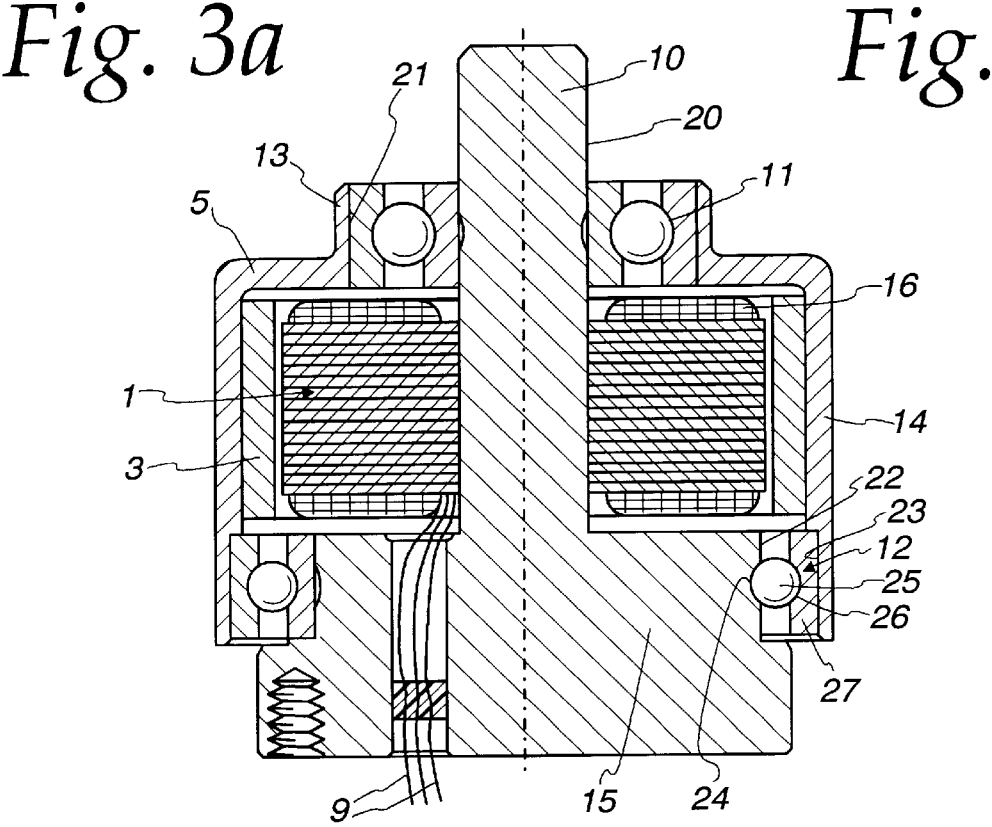
FIGS. 3a and 4a show the same embodiments as in FIG. 2 in their respective left halves.
FIG. 3b shows a third embodiment of the invention.

The prior art will first be described with reference to FIG. 1a (left half of the drawing), although reference will be made to similar components in the right part of the drawing (FIG. 1b), which shows a first embodiment of the invention.

A disc memory drive includes a housing 27 enclosing a clean room 17, at least one magnetic hard storage disk 18 located in the clean room, at least one read/write head 19 mounted in the clean room 17 for reading and writing data on the storage disk 18 and a brushless dc motor.

An internal stator 1 having excitation coils 16 is secured to an (in the drawing) vertical fixed shaft 10. The entire spindle driving motor is secured by the fixed shaft 10 by means of flange parts (as shown in FIGS. 1a and 1b) in a housing of a disc memory drive or the like. An external rotor 2 consisting essentially of rotor magnets and a back iron 5 is provided outside the internal stator 1. A driving hub 4 on which memory discs are supported in the case of a disc memory drive is secured outside the back iron 5. However, it is also possible to form the driving hub by means of the annular back iron 5 itself.

As shown in FIG. 1a, the annular back iron 5 is can-shaped with an upper section 13 having a smaller diameter in the form of a narrowed portion and a lower section 14 having a larger diameter. The rotor magnets 3 are also secured in this lower section 14. The upper section 13 is supported directly on the external diameter of the fixed shaft 10 by means of a first ball bearing 11, while the lower section 14 outside the internal stator 1 is supported on the fixed shaft 10 by means of a second bearing 12 with the interposition of a spacer ring 6 (left half of the drawing, FIG. 1a). The parts of the motor including both ball bearings 11 and 12 are sealed off from the exterior by suitable seals 7, in this case magnetic fluid seals. Moreover, the connecting wires 9 are brought out through a central bore 8 in the interior of the shaft. The first embodiment of the invention will now be described with reference to the right part of the drawing, i.e. FIG. 1b. The upper bearing arrangement of the back iron 5 or the driving hub 4 is designed just as in the left half according to FIG. 1a, and likewise the design of the internal stator 1 and the external rotor 2. However, a collar 15 having a larger diameter than the shaft 10 on which a ball bearing 12 having a larger diameter is arranged is integrally moulded with the fixed shaft 10 in the lower region. This ball bearing 12 directly supports the lower section 14 of the back iron 5, i.e. without a spacer ring. This therefore means that there is one joint fewer present and the construction is improved from the point of view of a uniform material structure, resulting in smoother running of the spindle driving motor. Moreover, as a result of the omission of the spacer ring 6 (FIG. 1a), the inertial mass of the rotor is reduced, there is an increase in the resonance frequencies as a result of greater rigidity of the bearing arrangement and, finally, the larger bearing means a higher load-bearing capacity and less wear.

FIG. 2 shows a similar design to that of FIG. 1b, although in this case the collar 15 is designed in the form of a shaft flange, allowing for simpler securing of the spindle driving motor and increasing the rigidity of the system. Components with the same reference numerals are similar to those according to FIG. 1b, and so they do not need to be described again. For the sake of clarity, the driving hub 4 is not shown in FIG. 2, although, as already stated, it can be formed by the external circumference of the back iron 5. By virtue of the fact that the collar 15 is designed as a shaft flange, there is no need for a central bore in the fixed shaft 10 and instead a corresponding bore 8a can be provided laterally in the collar 15, out through which the connecting wires 9 can then be brought. This means that the shaft 10 is not weakened.

FIG. 2 also shows in detail how the upper ball bearing 11 is arranged directly between the external diameter 20 of the shaft 10 and the internal diameter 21 of the upper section 13 of the back iron 5, while the lower ball bearing 12 is arranged directly between the increased diameter 22 of the collar 15 and the internal diameter 23 in the lower section of the back iron 5, so that the number of joints in the mechanical bearing arrangement of the back iron 5 on the shaft 10 is reduced to a minimum.

A variant of the embodiment according to FIG. 2 will now be described with reference to FIG. 3b. The left half of this drawing, i.e. FIG. 3a, corresponds to the left half according to FIG. 2. The embodiment according to FIG. 3b differs from that according to FIG. 2 in that the lower ball bearing 12 is partially integrated into the collar 15, i.e. in that the inner ball race 24 is worked into the external diameter 22 of the collar 15. The balls 25 of the lower ball bearing 12 therefore run between this integrated ball race 24 and a corresponding ball race 26 in the outer ball-bearing ring 27.

Figures 4A, 4B:
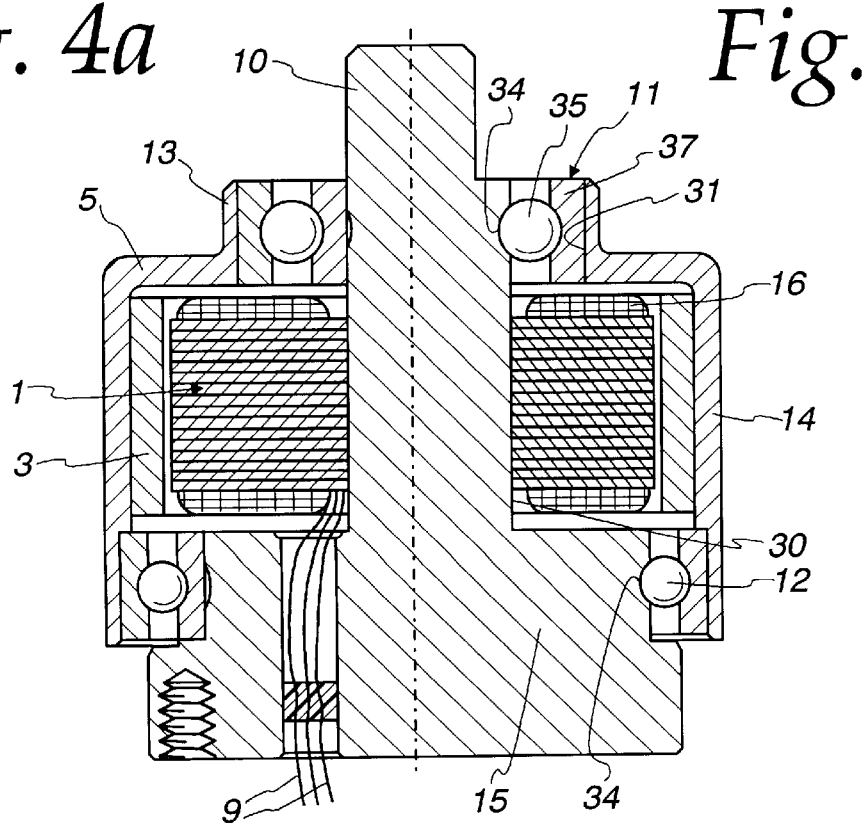
FIG. 4b shows a fourth embodiment of the invention.

A further embodiment according to FIG. 4b differs from that according to FIG. 3b in that the upper ball bearing 11 is also partially integrated into the fixed shaft 10 or into a corresponding shoulder having an external diameter 30. A ball race 34 is integrated into the outer surface 30 of the shaft 10. The balls 35 run between this ball race 34 and the corresponding ball race of an outer ball-bearing ring 37. The outer ball-bearing ring 37 is inserted into an internal bore 31 in the upper section 13 of the back iron 5. The left half of the drawing, i.e. FIG. 4a, corresponds to the left-hand views in FIGS. 2 and 3a.

Even if the ball races 24 or 34 (FIGS. 3b and 4b) are only worked into the inner surface, i.e. on the shaft 10 or the collar 15, while the outer surface has outer ball-bearing rings 27 or 37, it is theoretically also conceivable to dispense with the outer ball-bearing ring and to arrange corresponding ball races directly on the corresponding sections of the back iron 5. In this case, the surfaces must be appropriately hardened at these points of the back iron, although this sometimes has an adverse effect on the magnetic properties. Moreover, the entire assembly must of course be constructed correctly as far as assembly is concerned.

In order to have more degrees of freedom in the construction, i.e. so that the corresponding section of the fixed shaft 10 can be selected substantially freely in accordance with the requirements of the bearing arrangement, it is proposed according to the invention that the internal stator 1 is not manufactured in one piece and slipped axially on to the shaft 10, but is composed of several segments 41, i.e. at least two segments, so that radial assembly can be effected. A segment 41 of this kind having excitation coils 46 is shown in diagrammatic form in FIG. 5. It can also be seen here that the laminated stator segment is designed for nested assembly in order to improve the magnetic transitions. However, it is also conceivable to allow the individual stator segments 41 to be butt-jointed given accurate production. The partial excitation coils 46 on the stator segments 41 are connected together accordingly after assembly.

Figure 5:
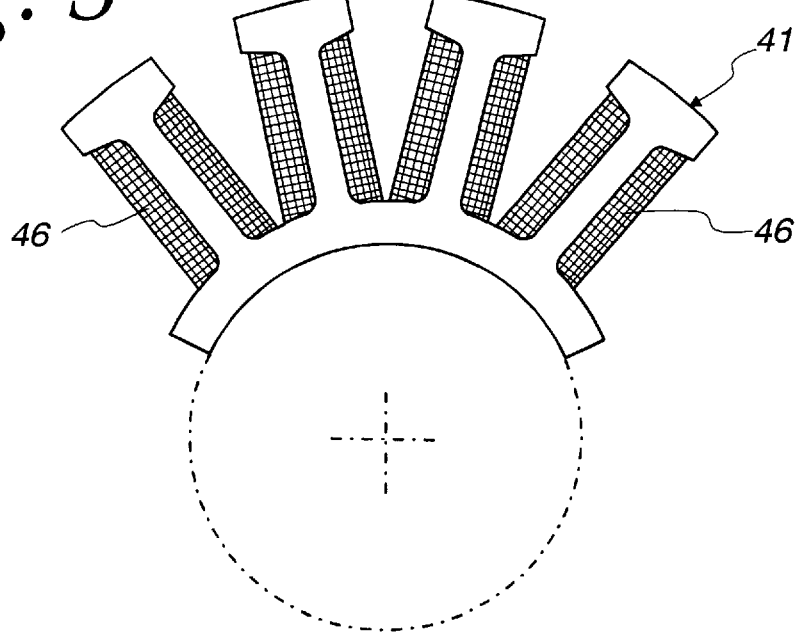
FIG. 5 is a diagrammatic end view of a sector of a divided internal stator.
Figures 6A, 6B:
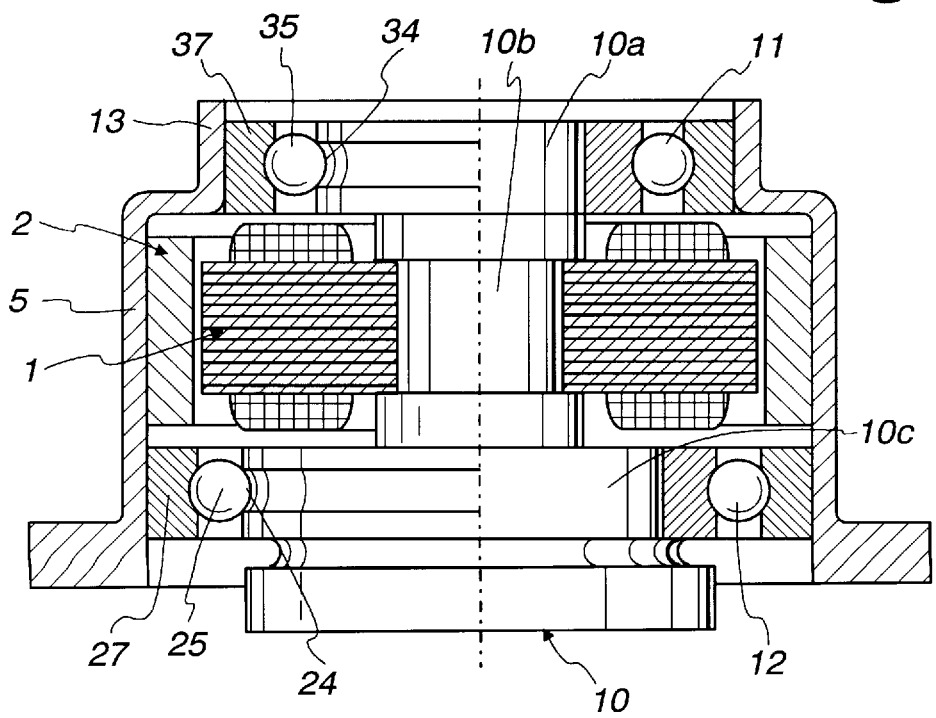
FIGS. 6a and 6b show a fifth and a sixth embodiment of the invention.
Figure 7:
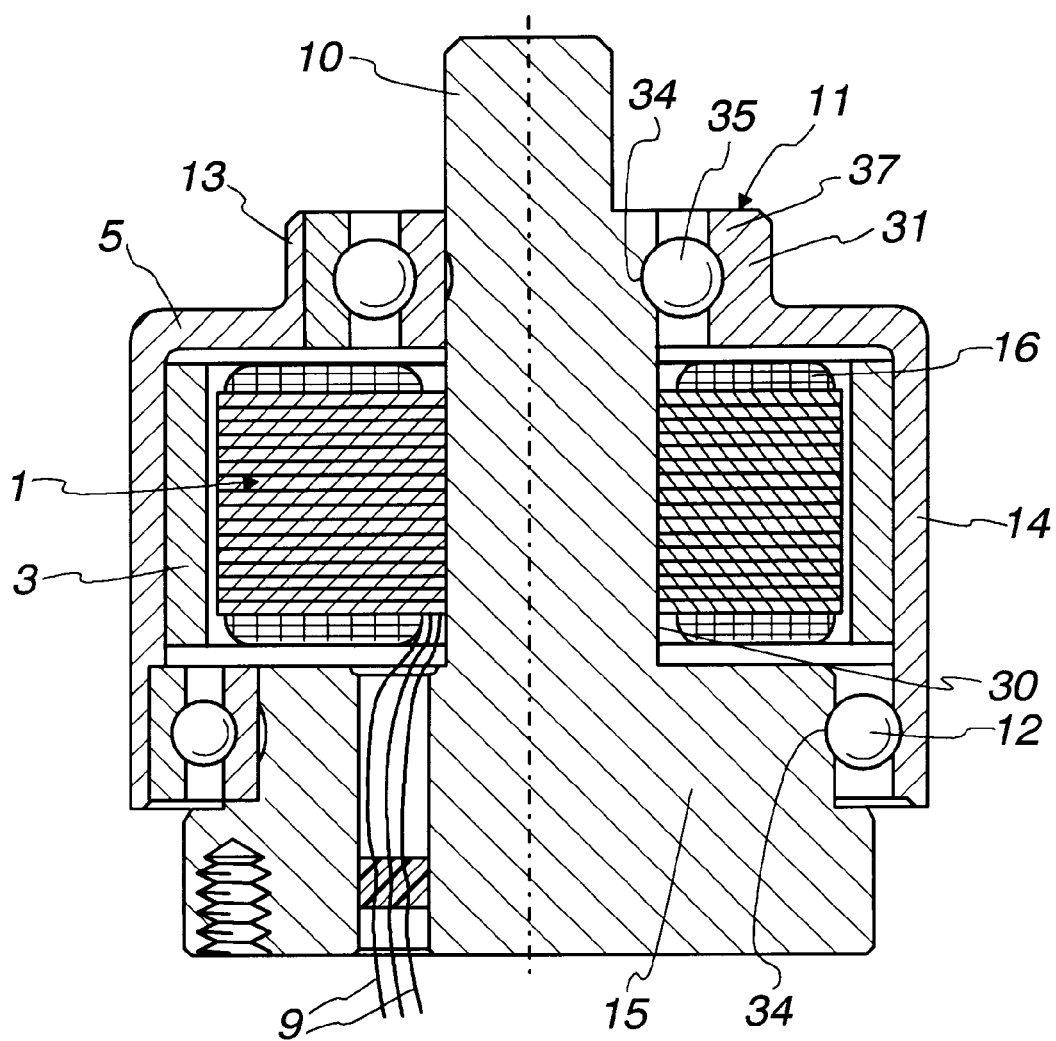
FIG. 7 shows a seventh embodiment of the invention.

FIGS. 6a and 6b then show how another design with more degrees of freedom is possible using a divided internal stator according to FIG. 5. It can be seen that the fixed shaft 10 has three sections 10a, 10b and 10c with different external diameters, the central section 10b having the smallest diameter and receiving the segments 41 of the internal stator 1. In this manner, the diametrical steps of the back iron 5 or the driving hub can be smaller, resulting in substantially identical sizes for the upper ball bearing 11 and the lower ball bearing 12. A construction of this kind therefore has better symmetry, resulting in lower heat-sensitivity for the bearing arrangement.

In FIG. 6a (right part of the drawing), both ball bearings 11 and 12 are designed as conventional bearings, i.e. they contain inner and outer ball-bearing rings which are arranged directly between the shaft 10 and the back iron 5. However, like the embodiment according to FIG. 4b, FIG. 6b (left half of the drawing) shows that the ball bearings 11 and 12 are partially integrated into the shaft 10, i.e. that corresponding ball races 24 and 34 are worked into corresponding sections 10c and 10a of the shaft 10. The opposing ball races for the balls 25, 35 are situated in corresponding outer ball-bearing rings 27, 37.

We claim:

1. A disk storage device comprising:
    a disk drive housing enclosing a clean room, the clean room having an internal mounting surface;
    at least one magnetic hard storage disk located in the clean room for rotation about an axis, the at least one disk having a central opening;
    at least one read/write head mounted in the clean room for reading and writing data on the storage disk; and
    a brushless dc motor mounted on the internal mounting surface of the clean room, the motor comprising:
        a stator concentrically disposed about the axis and having a winding disposed thereon,
        a bearing and shaft assembly including a shaft aligned on the axis, the shaft having first and second portions, and first and second bearings affixed to the first and second portions of the shaft, respectively, the second bearing having an inner race and an outer race, wherein the outer diameter of the second bearing is greater than the outer diameter of the first bearing, and
        a rotor supported on the bearing and shaft assembly for rotation about the axis, the rotor including a magnetically conducting member having a cylindrical surface, a permanent magnet rotor magnet affixed to the cylindrical surface of the magnetically conducting member and forming an essentially cylindrical air gap with the stator and a non-magnetic hub extending through a central opening of the storage disk in order to mount the at least one disk for rotation about the axis in the clean room;
    wherein at least one of the first and second portions of the shaft has a bearing raceway integrally formed therein;
    wherein the second portion of the shaft is axially adjacent the axially lowermost portion of the motor;
    wherein the second bearing is connected at its inner race to the second portion of the shaft and at its outer race directly to a surface of the magnetically conducting member.

2. The disk storage device of claim 1 wherein the stator comprises at least two individual segments, each of the segments including a portion of said winding.

3. The disk storage device of claim 1 wherein the magnetically conducting member has a bearing raceway integrally formed therein.

4. The disk storage device of claim 1 wherein each of the first and second bearings has an inner race integrally formed in the portion of the shaft corresponding thereto.

5. The disk storage device of claim 1 wherein the shaft comprises a fixed shaft.

6. The disk storage device of claim 1 wherein the stator further includes connecting wires and wherein the second portion of the shaft includes an axial bore through which the connecting wires can pass.

7. The disk storage device of claim 1 wherein the shaft, the bearings and the magnetically conductive material comprise the same material.

8. The disk storage device of claim 1 wherein the rotor comprises an external rotor.

9. The disk storage device of claim 1 further comprising at least two seals for generally sealing the internal space of the motor from the clean room.

10. The disk storage device of claim 1 wherein the cylindrical surface of the magnetically conducting member has a bearing raceway integrally formed therein.

11. The disk storage device of claim 1 wherein cylindrical surface of the magnetically conducting member and at least one of the first and second portions of the shaft has a bearing raceway integrally formed therein.

12. The disk storage device of claim 1 wherein each of the first and second portions of the shaft and the cylindrical surface of the magnetically conducting member has a bearing raceway integrally formed therein.

13. The disk storage device of claim 1 wherein the first and second portions of the shaft have a bearing raceway integrally formed therein and wherein the cylindrical surface of the magnetically conducting member has a bearing race integrally formed therein for both the first and second bearings.

14. An information storage device comprising:
    at least one moveable storage medium other than a magnetic hard storage disk; and
    a brushless dc motor comprising:
        a stator concentrically disposed about an axis and having a winding disposed thereon,
        a bearing and shaft assembly including a shaft aligned on the axis, the shaft having first and second portions, and first and second bearings affixed to the first and second portions of said shaft, respectively, said second bearing having an inner race and an outer race, wherein the outer diameter of the second bearing is greater than the outer diameter of said first bearing, and
        a rotor supported on the bearing and shaft assembly for rotation about the axis, the rotor including a magnetically conducting member having a cylindrical surface, a permanent magnet rotor magnet affixed to the cylindrical surface of the magnetically conducting member forming an essentially cylindrical air gap with the stator and a non-magnetic hub extending through a central opening of the storage medium in order to mount the at least one storage medium for rotation about the axis;
    wherein the second portion of the shaft is axially adjacent the axially lowermost portion of the motor;
    wherein at least one of the first and second portions of the shaft has a bearing raceway integrally formed therein;
    wherein the second bearing is connected at its inner race to the second portion of the shaft and at its outer race directly to a surface of the magnetically conducting member.

15. The information storage device of claim 14 wherein the stator comprises at least two individual segments, each of the segments including a portion of the winding.

16. The information storage device of claim 14 wherein the magnetically conducting member has a bearing raceway integrally formed therein.

17. The information storage device of claim 14 wherein each of the first and second bearings has an inner race integrally formed in the portion of the shaft corresponding thereto.

18. The information storage device of claim 14 wherein the shaft comprises a fixed shaft.

19. The information storage device of claim 14 wherein the stator further includes connecting wires and wherein the second portion of the shaft includes an axial bore through which the connecting wires can pass.

20. The information storage device of claim 14 wherein the rotor comprises an external rotor.

21. The information storage device of claim 14 wherein the shaft, the bearings and the magnetically conductive material comprise the same material.

22. The information storage device of claim 14 wherein the cylindrical surface of the magnetically conducting member has a bearing raceway integrally formed therein.

23. The information storage device of claim 14 wherein the cylindrical surface of the magnetically conducting member and at least one of the first and second portions of the shaft has a bearing raceway integrally formed therein.

24. The information storage device of claim 14 wherein each of the first and second portions of the shaft and the cylindrical surface of the magnetically conducting member has a bearing raceway integrally formed therein.

25. The disk storage device of claim 14 wherein the first and second portions of the shaft have a bearing raceway integrally formed therein and wherein the cylindrical surface of the magnetically conducting member has a bearing race integrally formed therein for both the first and second bearings.

* * * * *

UNITED STATES PATENT AND TRADEMARK OFFICE
CERTIFICATE OF CORRECTION

PATENT NO. : 5,945,751
DATED : August 31, 1999
INVENTOR(S) : HANS et al.

It is certified that error appears in the above-identified patent and that said Letters Patent is hereby corrected as shown below:

On the title page item [63],
    Under "Related U.S. Application Data", change "Feb. 27, 1993" to --December 27, 1993--.

Signed and Sealed this

Twenty-fifth Day of April, 2000

Attest:

*Attesting Officer*

Q. TODD DICKINSON

*Director of Patents and Trademarks*